Patented Feb. 5, 1924.

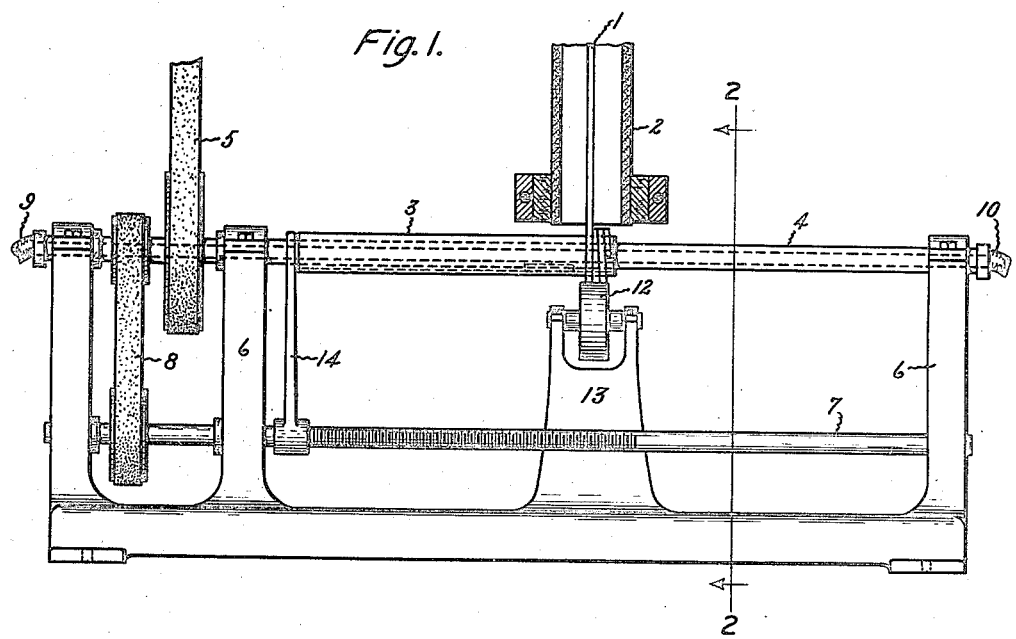
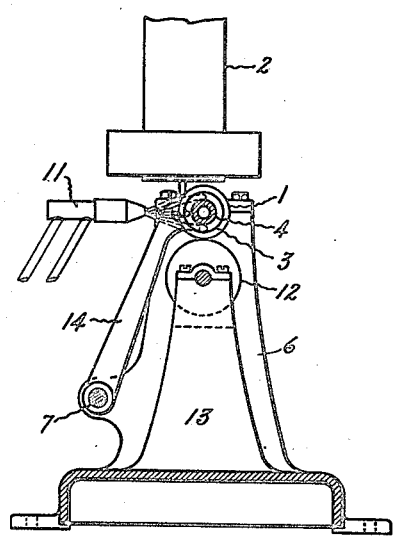

1,482,455

UNITED STATES PATENT OFFICE.

EDWARD R. BERRY, OF MALDEN, MASSACHUSETTS, ASSIGNOR TO GENERAL ELECTRIC COMPANY, A CORPORATION OF NEW YORK.

QUARTZ WORKING.

Application filed September 20, 1922. Serial No. 589,471.

*To all whom it may concern:*

Be it known that I, EDWARD R. BERRY, a citizen of the United States, residing at Malden, in the county of Middlesex, State of Massachusetts, have invented certain new and useful Improvements in Quartz Working, of which the following is a specification.

The present invention relates to production of tubes from fused quartz.

It is the object of my invention to provide a method and apparatus of shaping silica while in a plastic state into hollow shapes such as tubes. My apparatus is capable of automatic or substantially automatic operation, and whereby it is possible to produce articles of desired size from clear and substantially bubble-free material.

Full utilization of the valuable properties of silica glass in the technical arts has been retarded by the arduousness of the manufacturing operations and because of the high degree of skill required in carrying out the manufacture of articles of regular shapes. This is especially true of the production of clear quartz glass tubes.

By the ordinary method of making tubing, particularly sizes of one inch or above, by hand, or by blowing, the walls will be wavy or nonuniform in thickness making it undesirable for light transmission, but by the method described herein the walls readily can be made of uniform thickness. Furtermore it is possible to make perfect shapes varying in diameter from one end to the other, such, for instance as the frustrum of a cone.

In accordance with my present invention, tubes of clear silica are made from cane or strip material which can be easily produced in a state of almost complete freedom from bubbles or cavities. As set forth with greater particularity in the appended claims, hollow bodies, such as tubes or the like, are made in accordance with my invention by coiling strip or cane silica while in a plastic state, preferably into the form of a closed helix and subjecting the wall of the same while plastic to pressure to cause coalescence of adjacent turns.

The accompanying drawing shows in Fig. 1 a somewhat conventionalized elevation; and in Fig. 2 a side view of an apparatus for carrying out my invention.

The drawing shows a strip or cane 1 of quartz glass passing through a heating zone, as for example, a tubular electric resistance heater 2, for heating the quartz glass to the softening temperature. The strip then is wound upon a form or mandrel 3 consisting of carbon, or other suitable refractory material mounted on a shaft 4, which is rotated by a suitable means, such as a belt 5. In the drawing the mandrel is shown as having a uniform diameter but, of course, other shapes capable of being withdrawn from the finished article may be used. Mounted on the same frame 6 with the shaft 4 is a lead screw 7 conveniently driven by a belt 8 from the shaft 4 and acting to feed forward the mandrel 3 by a finger 14. The shaft 4 may be electrically heated, as indicated by the electric supply conductor 9, 10, although this heating is not essential in all cases. Preferably, however, a flame from a blow pipe 11 plays upon the quartz glass strip as it is coiled upon the mandrel to keep the glass plastic. Coalescence of the coils of quartz glass are produced by a roller 12, which is mounted on a support 13, and bears against the plastic quartz helix.

What I claim as new and desire to secure by Letters Patent of the United States, is:—

1. The method of producing hollow articles of quartz glass which consists in winding cane or strip quartz while plastic upon a mandrel so that the adjacent coils are in close proximity and subjecting said coils while plastic to pressure upon said mandrel to produce a tube of substantially uniform thickness.

2. The method of shaping quartz which consists in winding quartz cane or strip to form a hollow body of desired configuration, the walls of which consist of turns of said cane closely adjacent to each other, and subjecting said walls of the body to heat and pressure to cause coalescence and equalization of thickness of said walls.

3. The method of producing quartz tubing which consists in coiling strip quartz while in a plastic state into the form of a closed helix while progressively subjecting the coils of said helix while plastic to pressure to cause coalescence thereof.

4. The method of producing tubes of amorphous quartz from quartz cane or strip of materially smaller diameter than the desired diameter of tubing which consists in coiling said cane or strip into tubular form, subjecting said coiled strip locally to heat and pressure applied parallel to the axis of said tube and at an angle to said strip to cause coalescence of said strips and equalization of thickness and advancing the region of heat and pressure application by a spiral path over the surface of said tube.

5. A quartz working apparatus comprising the combination of a rotatable mandrel, means for delivering to said mandrel strip or cane of quartz in a plastic state and means for externally applying pressure to coils of quartz wound upon said mandrel.

6. A quartz working apparatus comprising the combination of a rotatable form or mandrel, means for delivering thereto a strip of plastic quartz, means for rotating said mandrel while feeding the same longitudinally, means for applying heat to quartz strip coiled upon said mandrel and means for applying pressure externally upon the coils of said strip to cause coalescence thereof.

In witness whereof, I have hereunto set my hand this 18th day of September, 1922.

EDWARD R. BERRY.